(12) United States Patent
Ganasan et al.

(10) Patent No.: US 7,246,188 B2
(45) Date of Patent: Jul. 17, 2007

(54) FLOW CONTROL METHOD TO IMPROVE BUS UTILIZATION IN A SYSTEM-ON-A-CHIP INTEGRATED CIRCUIT

(75) Inventors: J. Prakash Subramaniam Ganasan, Youngsville, NC (US); Perry Willmann Remaklus, Jr., Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 172 days.

(21) Appl. No.: 11/055,922

(22) Filed: Feb. 10, 2005

(65) Prior Publication Data

US 2006/0179192 A1    Aug. 10, 2006

(51) Int. Cl.
*G06F 13/14* (2006.01)
(52) U.S. Cl. ...................................... 710/241
(58) Field of Classification Search ................ 710/241, 710/118
See application file for complete search history.

(56) References Cited

U.S. PATENT DOCUMENTS

| | | | | | |
|---|---|---|---|---|---|
| 5,581,729 | A | * | 12/1996 | Nishtala et al. | 711/143 |
| 5,761,516 | A | * | 6/1998 | Rostoker et al. | 710/260 |
| 5,907,485 | A | | 5/1999 | Van Loo et al. | |
| 5,956,524 | A | * | 9/1999 | Gajjar et al. | 710/62 |
| 6,065,077 | A | * | 5/2000 | Fu | 710/100 |
| 6,347,344 | B1 | * | 2/2002 | Baker et al. | 710/20 |
| 6,441,479 | B1 | * | 8/2002 | Ahn et al. | 257/700 |
| 6,516,442 | B1 | * | 2/2003 | Wang et al. | 714/776 |
| 6,715,023 | B1 | * | 3/2004 | Abu-Lebdeh et al. | 710/317 |
| 6,857,035 | B1 | * | 2/2005 | Pritchard et al. | 710/110 |
| 2004/0054843 | A1 | * | 3/2004 | Abhay et al. | 710/317 |
| 2004/0123011 | A1 | * | 6/2004 | Murayama et al. | 710/305 |

FOREIGN PATENT DOCUMENTS

| | | |
|---|---|---|
| EP | 0608663 | 1/1993 |
| WO | 03014948 | 2/2003 |

OTHER PUBLICATIONS

PCI Local Bus Specification, Revision 2.2, Dec. 18, 1998.

\* cited by examiner

*Primary Examiner*—Paul R. Myers
(74) *Attorney, Agent, or Firm*—Nicholas J. Pauley; Thomas Rouse; Joseph B. Agusta

(57) ABSTRACT

A system-on-chip (SoC) integrated circuit (IC) has reduced bus contention and improved bus utilization. The SoC IC includes a bus controller. Masters interconnected with the bus controller issue requests for data and receive requested data in response to the requests. Slaves interconnected with the bus controller receive the requests for data and provide the requested data to the requesting masters. Control signals issued by the bus controller indicate to each slave which masters are not ready to receive the data it requested from that slave. The slaves delay transferring data to any masters that are not ready for the requested data, and provide data to different masters that are ready to receive the data they requested from the slaves.

20 Claims, 2 Drawing Sheets

FLOW CONTROL METHOD TO IMPROVE BUS UTILIZATION IN A SYSTEM-ON-A-CHIP INTEGRATED CIRCUIT

TECHNICAL FIELD

The technical field involved is generally system-on-chip (SoC) integrated circuits (IC). More particularly, the technical field involved is a method for improving bus utilization within a SoC IC.

DESCRIPTION OF THE RELATED ART

The term system-on-chip (SoC) IC is used to refer to a system in which all desired and/or necessary functions are integrated onto and fabricated upon a single die or substrate. As such, a SoC IC generally includes various functional blocks of circuitry, such as, for example, microprocessors, digital signal processors, memory arrays, buffers, and so on. Such functional blocks of circuitry are sometimes referred to as cores. The cores are each electrically connected to a system bus within the SoC IC over which they exchange data with each other and any other devices connected to the bus.

More particularly, within a SoC IC, a core that issues a request to access (either write data to or read data from) another core is variously referred to as an initiator core, initiator, or bus master. The core that the initiator or master wishes to access, i.e., the core receiving the write data or providing the read data, is referred to as the target or slave. In order to avoid bus contention, which is a conflict that occurs when two or more cores attempt to place data on or retrieve data from the bus, a bus controller is incorporated within the SoC IC.

The bus controller typically includes an arbiter that selects which master is granted access to a slave at any given time. Thus, by ensuring that only one master accesses a given slave within any given access or data transfer cycle, bus contention and data collisions on the bus are avoided. This approach provides the masters with sequential access to the slaves, i.e., the masters take turns accessing the slaves. Such sequential access is relatively slow and inefficient, and can adversely affect system performance.

Switch matrix type bus controllers are sometimes used to increase bus utilization and thereby improve system performance. Each slave and each master is connected to the switch matrix bus controller by respective master or slave bus lines. Thus, switch matrixces provide masters with parallel access to the slaves, i.e., different masters can simultaneously access respective and different slaves, and vice versa. However, bus contention is not entirely avoided by the use of switch matrix type bus controllers. Bus contention and/or data collisions can occur in a SoC IC having a switch matrix when, for example, one master attempts to access two or more slaves. Since each master is connected to the switch matrix by a single corresponding bus line, a data collision may occur when the two or more slaves are simultaneously prepared to return data to and/or respond to a request of a single requesting master. In addition, a master which makes a sequence of requests may require that the responses or completions are returned in the same order that the requests were made.

In order to avoid data collisions, as well as to ensure the completion order of a master's request, the switch matrix typically includes logic for delaying or routing requests and/or a request queue or buffer for storing data or responses. The routing logic ensures only a single set of data is placed on the bus by blocking or delaying all other responses until the prior response is successfully completed. The response queue or buffer may store multiple requests from the masters, typically in a first-in first-out manner, and avoids data collisions by holding data in the queue until the bus is prepared to receive the data and either the slave is prepared to deliver the data to the bus or the master is prepared to receive the data. The response queue may also hold a response or data for a newer request while waiting for another slave to complete a response or return data for an older request in order to maintain the program order of the master's request.

However, delaying or queuing one or more pending requests until a prior request is successfully completed wastes bus capacity, particularly when the delay in completing the prior request is due to a slave that is not yet ready to place requested data onto the bus or a master that is not yet ready to receive data from the bus. In such situations, the bus is not being used to transfer data but is rather waiting to do so. In other words, in such situations the bus is not the bottle neck. Thus, the bus could, in the interim, be more efficiently utilized for transferring data that is available and ready to be processed rather than sitting idle while the system waits for other cores to complete a prior request or data transfer.

Therefore, what is needed in the art is a method and apparatus for improving bus utilization within a system-on-a-chip integrated circuit.

SUMMARY

Provided is a system-on-chip (SoC) integrated circuit (IC) having improved bus utilization and more efficient data transfer. Also provided is a method for improving bus utilization and data transfer.

In one embodiment, a SoC IC having a bus controller is provided. Masters interconnected with the bus controller issue requests for data and receive requested data in response to the requests. Slaves interconnected with the bus controller receive the requests for data and provide the requested data to the requesting masters. Control signals issued by the bus controller indicate to each slave which masters are not ready to receive the data it requested from that slave. The slaves delay transferring data to any masters that are not ready for the requested data, and provide data to different masters that are ready to receive the data they requested from the slaves.

When a slave is required to delay a particular data transfer the slave can proceed to transfer other data, thereby increasing bus utilization and data transfer efficiency, helping to avoid bus contention and data collisions.

Additionally the need for storage buffers/registers in the bus controller of the SoC IC may be reduced and, thus, the size and power consumption of the bus controller may also be reduced.

BRIEF DESCRIPTION OF THE DRAWINGS

The above-mentioned and other features and advantages, and the manner of attaining them, will become apparent and be better understood by reference to the following description of one embodiment in conjunction with the accompanying drawings, wherein.

Corresponding reference characters indicate corresponding parts throughout the several views. The exemplifications set out herein illustrate one preferred embodiment, in one form, and such exemplifications are not to be construed as limiting the scope of this document nor the claims in any manner.

DETAILED DESCRIPTION OF THE DRAWINGS

Figure 1:
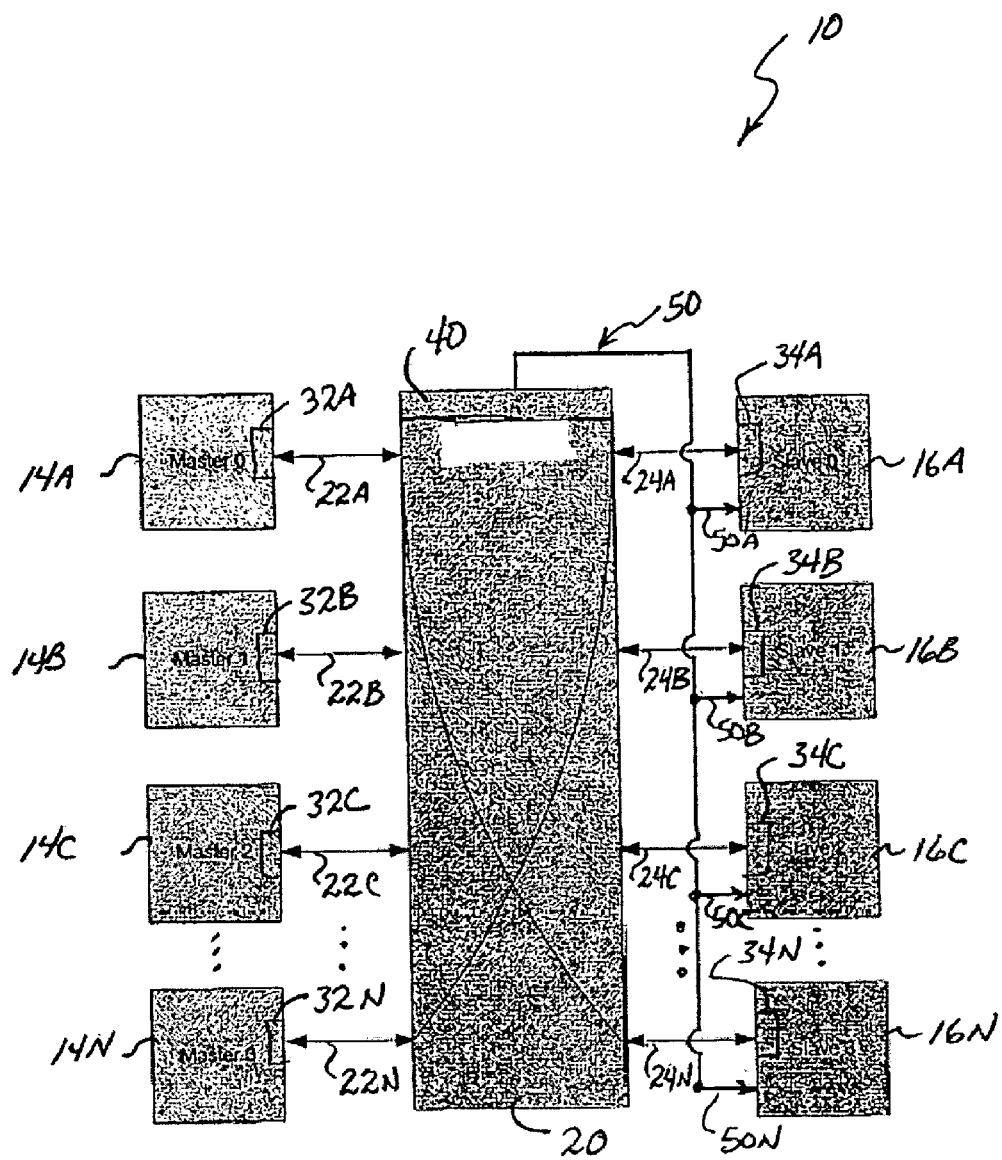
FIG. 1 is a block diagram of one embodiment of a system-on-chip integrated circuit.

Referring now to the drawings and particularly to FIG. 1, there is shown one embodiment of a system-on-chip (SoC) integrated circuit (IC) 10. SoC IC 10 includes a substrate 12 upon which all of the circuitry of SoC IC 10 is fabricated. SoC IC 10 includes a plurality of blocks of circuitry for performing various functions.

More particularly, SoC IC 10 includes a plurality of masters 14A, 14B, 14C, . . . , and 14N (collectively referred to hereinafter as masters 14) and a plurality of slaves 16A, 16B, 16C, . . . , and 16N (collectively referred to hereinafter as slaves 16). Masters 14 and slaves 16 are configured as conventional master and slave devices, such as, for example, microprocessors and memory arrays, respectively. Masters 14 are each interconnected with bus controller 20 via a separate and corresponding bus 22A, 22B, 22C, . . . , and 22N (hereinafter sometimes referred to as the master-to-controller bus 22 or simply the master bus 22). Similarly, slaves 16 are each interconnected with bus controller 20 via a separate and corresponding bus 24A, 24B, 24C . . . , and 24N (hereinafter sometimes referred to as the slave-to-controller bus 22 or simply the slave bus 24). Masters 14 and slaves 16 are also typically interconnected via other bus or signal lines to other cores (neither of which are shown) within SoC IC 10. Masters 14 each preferably include respective master buffers 32A, 32B, 32C, . . . , and 32N, and similarly slaves 16 each preferably include respective slave buffers 34A, 34B, 34C . . . , and 34N.

Bus controller 20, in addition to performing the functions of a conventional switch matrix type bus controller, includes logic circuitry 40 that issues control signals 50A, 50B, 50C, . . . , 50N (hereinafter collectively referred to control signals 50) to slaves 16A, 16B, 16C . . . , and 16N, respectively. Generally, control signals 50 indicate to slaves 16 the readiness of each master 14 to receive data. More particularly, control signals 50 indicate to each slave 16 whether a master 14 is ready and able to receive data from that particular slave. Thus, from the opposite point of view, control signals 50 indicate to each slave 16 when a master 14 is "busy" or otherwise not able to receive requested data and/or complete a specific data transfer. Control signals 50 may be shared or point-to-point from the bus controller 20 to slaves 16.

Each control signal 50A, 50B, 50C, . . . , and 50N is dependent at least in part upon the status or operating state of masters 14. When a master 14 is prepared to receive data it has requested from an identified one of slaves 16, controller 20 issues a corresponding control signal 50 to the identified slave 16 that indicates the readiness of the requesting master 14 to receive the data requested (hereinafter referred to as a "ready" control signal). Conversely, when a master 14 is not prepared to receive data it has requested from an identified one of slaves 16, such as, for example, when the requesting master 14 is receiving data previously requested from a different one of slaves 16 or is otherwise "busy", controller 20 issues a control signal 50 to the identified slave 16 that indicates the requesting master 14 is not prepared to receive the previously requested data (hereinafter referred to as a "not ready" or "busy" control signal).

Control signals 50 ensure that only one of slaves 16 places data for a single requesting master onto the slave-to-control bus 24 and, thus, onto the controller-to-master bus 22 during any given read cycle. Thus, control signals 50 avoid data collisions that might otherwise occur on the controller-to-master bus 22 when two or more slaves 16 have provided to controller 20 data intended for the same requesting master 14.

Further, when a requesting master has indicated it is not ready to receive requested data from a particular slave, control signals 50 instruct that the slave, if prepared, to carry out a different data transfer to a different requesting master. Thus, the slave does not sit idle waiting for the master to be "ready" to receive data. Rather the slave conducts a different data transfer to a different requesting master that is "ready" to receive data. By executing a different data transfer operation rather than waiting to complete the delayed data transfer operation, the efficiency with which data is processed by the bus and thereby utilization of the bus are improved. This also may reduce the overall latency of the requests as other responses may be blocked behind a response which the controller may be unable to accept due to bus contention.

Figure 2:
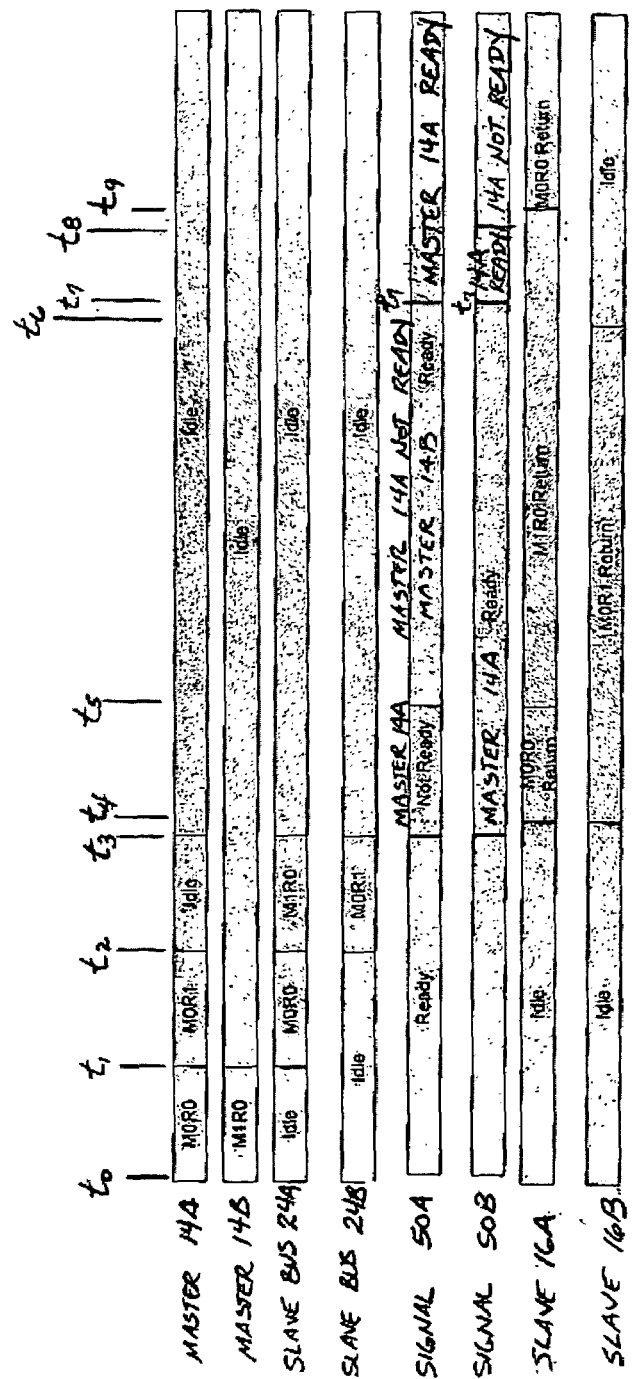
FIG. 2 is a timing diagram illustrating one embodiment of a method for improving bus utilization in a system-on-chip integrated circuit.

An exemplary data transfer process that illustrates the operation of SoC 10 and the method for improving bus utilization in a system-on-chip integrated circuit is shown in FIG. 2 and described hereinafter. At time $t_0$ master 14A issues to bus controller 20 via master bus 22A request M0R0 to read data from slave 16A. Also during time $t_0$, master 14B via master bus 22B issues to bus controller 20 request M1R0 to also read data from slave 16A. At time $t_1$ master 14A issues to bus controller 20 via master bus 22A request M0R1 to read data from slave 16B. Thus, two masters (masters 14A and 14B) are requesting data from the same slave (slave 16A) and one master (master 14A) has requested data from two different slaves (slaves 16A and 16B).

Also at time $t_1$, bus controller 20 passes to slave 16A via slave bus 24A the request M0R0 issued by master 14A at time $t_0$ for data from slave 16A. Similarly, at time $t_2$ bus controller 20 passes to slave 16A via slave bus 24A the request M1R0 issued by master 14B at time $t_0$ for data from slave 16A. Also at time $t_2$, bus controller 20 passes to slave 16B via slave bus 24B the request M0R1 issued by master 14A at time $t_1$ for data from slave 16B.

Control signals 50A and 50B are, as shown in FIG. 2, initially set at time $t_0$ to a default value or condition, such as, for example "ready" and thereby indicate that all masters 14 are ready to receive data. At time $t_3$, bus controller 20 issues or updates control signals 50 to enable the transfer of at least one set of requested data. More particularly, control signal 50B is updated to indicate that master 14A is prepared to receive the data it has previously requested from slave 16B. Since, in this example, control signals 50 were initialized to a "ready" state, there is no change to control signal 50B. Conversely, control signals 50A, 50C, . . . , and 50N are updated to indicate to slaves 16A, 16C, . . . , and 16N, respectively, that master 14A is "busy" preparing to or is in the process of receiving data.

For reasons of brevity and clarity, only control signals 50A and 50B are shown in FIG. 2. Further, for the same reasons, although one of normal skill in the art will recognize that each control signal 50 is actually a plurality of signals, FIG. 2 shows only one signal line for each control signal and notates the pertinent condition or state of that signal line relative to the masters 14.

At time $t_4$, each of slaves 16A and 16B are prepared to transfer data to master 14A that master 14A previously requested. More particularly, at time $t_4$ slave 16A is prepared to transfer to master 14A the data associated with request M0R0 and slave 16B is prepared to provide to master 14A the data associated with request M0R1. Although slaves 16A and 16B are both prepared to provide data to master 14A, slave 16B is given priority by the control signals 50 issued by controller 20, as discussed above. It should be particularly noted that the relative priority between slaves 16 which are at any given read cycle prepared to provide data to a single master 14 is predetermined according to any desired or preferred method known to one of ordinary skill in the art. The priority is, for example, arbitrarily established, established according to the predicted or anticipated importance of the data a particular slave may provide in light of the specific circuit or application, or by any other desirable criteria.

Slave 16A attempts at time $t_4$ to return to master 14A the data associated with request M0R0 but is precluded from doing so by control signal 50A which indicates to slave 16A, as described above, that master 14A is "busy". In prior art SoC IC systems, such a situation would result in either a data collision on the master bus 22A when slave 16A attempted to return the data to master 14A, requiring the controller 20 to buffer the data being returned, or in slave 16A delaying the transfer of all other requested data to any of masters 14 until slave 16A is able to complete the transfer of data associated with request M0R0 to master 14A. By contrast, and as is more particularly described hereinafter, slave 16A transfers other requested data to other requesting masters 14 and thereby more efficiently utilizes the buses 22 and 24 and accomplishes more efficient data transfer.

Also at time $t_4$, slave 16B commences transfer of data to master 14A associated with request M0R1. This data transfer is enabled at least in part by controller 20 setting control signal 50B to indicate at time $t_3$ that master 14A is "ready" to receive data from slave 16B and to set control signals 50A, 50C, . . . , and 50N to indicate that master 14A is "busy" and thus not ready to receive data from slaves 16A, 16C, . . . and 16N. The data associated with request M0R1 is returned from slave 16B to bus controller 20 via slave bus 24B and from bus controller 20 to master 14A via master bus 22A from time $t_4$ through time $t_6$.

It should be particularly noted that in the above-described data transfer method, i.e., generally from a slave 16 to bus controller 20 via a corresponding slave bus 24 and from bus controller 20 to a master 14 via a corresponding master bus 22, bus controller 20 acts essentially as a switch matrix that simply establishes a connection between the master and slave. The data to be transferred remains stored at or within buffers 34 of slaves 16 rather than being stored at controller 20. The need for buffering or storage registers within bus controller 20 is, therefore, substantially reduced. Accordingly, bus controller 20 is able to be reduced in size and to consume less power than conventional bus controllers that require a significant number of buffers/storage registers.

As noted above, rather than forcing a slave 16 and a portion of the buses 22 and/or 24 to sit idle until a requesting master 14 is "ready" to receive data, SoC IC 10 and the method for improving bus utilization in a system-on-chip integrated circuit described herein enable a slave to transfer other requested data to other requesting masters 14 and thereby more efficiently utilize the buses 22 and 24 and achieve more efficient data transfer. This aspect is illustrated in FIG. 2 when slave 16A, rather than delaying the transfer of all data until master 14A is ready to receive the data associated with delayed request M0R0, commences at time $t_5$ transferring to master 14B the data associated with request M1R0. The transfer of the data associated with request M1R0 is enabled by control signal 50A indicating to slave 16A that, although master 14A was "busy", master 14B was "ready" to receive data.

Thus, by delaying the transfer of data at time $t_4$ from slave 16A to master 14A and enabling at time $t_5$ slave 16A to commence the transfer of data to master 14B, a data collision on master-to-controller bus 22A at time $t_4$ is avoided and the utilization of the master-to-controller bus 22A and slave-to-controller bus 24A at time $t_4$ are increased thereby increasing the efficiency of data transfer.

Slave 16A completes at time $t_9$ the transfer of associated with request M1R0 to master 14B. Accordingly, at time $t_{10}$ control signals 50 are updated by controller 20 to indicate to slaves 16 that master 14B is once again "ready" to receive data (not shown in FIG. 2). In the example depicted, no further data is transferred to master 14B.

At time $t_6$, slave 16B completes the transfer of data associated with request M0R1 to master 14A. Accordingly, at time $t_7$ control signals 50 are updated by controller 20 to indicate to slaves 16 that master 14A is once again "ready" to receive data. At time $t_8$, control signals 50 are again updated by controller 20 to indicate that master 14A is once again preparing to or is in the process of receiving data. More particularly, at time $t_8$ control signals 50 are updated by controller 20 such that control signal 50A indicates to slave 16A that master 14A is "ready" to receive the data associated with request M0R0 and control signals 50B, 50C, . . . , and 50N are updated to indicate that master 14A is "busy". Thereafter, at time $t_9$ the transfer of data from slave 16A to master 14A associated with request M0R0 commences.

While the foregoing description is referenced to a preferred design, the preferred design can be further modified within the spirit and scope of this disclosure. This application is therefore intended to cover any variations, uses, or adaptations of the preferred design using the general principles disclosed herein. Further, this application is intended to cover such departures from the present disclosure as come within the known or customary practice in the relevant arts and which fall within the limits of the appended claims.

What is claimed is:

1. A system-on-chip (SoC) integrated circuit (IC), comprising:
   a bus controller;
   a plurality of slaves interconnected with said bus controller via respective slave buses;
   a plurality of masters interconnected with said bus controller via respective master data buses, a first one of the plurality of masters configured to issue requests to a first one of the plurality of slaves and a second one of the plurality of slaves, a second one of the plurality of masters configured to issue a request to the first one of the plurality of slaves,
   wherein said first and second ones of the plurality of slaves receiving said requests for data and providing said requested data at the same time in response to the requests issued from the first one of the plurality of masters; and
   control signals issued by said bus controller and indicating to each slave a readiness of the first one of the plurality of masters to receive data it requested from that slave, the second one of the plurality of slaves sending the requested data to the first one of the plurality of masters causing the first one of the plurality of slaves to send the data requested from the second one of the plurality of masters to the second one of the plurality of masters without having to stall awaiting the first one of the plurality of masters to become ready.

2. The SoC IC of claim 1, wherein said control signals indicate to the plurality of slaves which one or more of the plurality of masters are not ready to receive requested data.

3. The SoC IC of claim 2, wherein said control signals further indicate to the plurality of slaves which one or more masters are ready to receive requested data.

4. The SoC IC of claim 2, wherein a first slave delays transferring first data requested by a first master when a first control signal indicating said first master is not ready to receive the first requested data.

5. The SoC IC of claim 2, wherein said first control signal further indicates the second one of the plurality of masters is ready to receive second data requested thereby from said first slave,
said first slave transferring the second requested data to said second master in response to said first control signal.

6. The SoC IC of claim 2, each of said slaves including respective buffers, data requested from a particular slave by a requesting master being retained in the buffer of the particular slave when a corresponding control signal indicates to the particular slave that the requesting master is not ready to receive the requested data, the requested data being retained in the buffer of the particular slave until the corresponding control signal indicates to the particular slave that the master is ready to receive the requested data from the particular slave.

7. An electronic system, comprising:
a bus controller;
a plurality of slaves interconnected with said bus controller via a slave bus;
a plurality of masters interconnected with said bus controller via a master data bus, a first one of the plurality of masters configured to issue requests to a first one of the plurality of slaves and a second one of the plurality of slaves, a second one of the plurality of masters configured to issue a request to the first one of the plurality of slaves,
wherein said first and second ones of the plurality of slaves configured for receiving said requests for data and providing said requested data at the same time in response to the requests issued from the first one of the plurality of masters; and
control signals issued by said bus controller to said plurality of slaves, said control signals indicating to said slaves a readiness of said plurality of masters to receive requested data, the second one of the plurality of slaves sending the requested data to the first one of the plurality of masters causing the first one of the plurality of slaves to send the data requested from the second one of the plurality of masters to the second one of the plurality of masters without having to stall awaiting the first one of the plurality of masters to become ready.

8. The electronic system of claim 7, wherein said control signals indicate to said plurality of slaves which one or more of the plurality of masters are not ready to receive requested data.

9. The electronic system of claim 8, wherein said control signals indicate to said plurality of slaves which one or more of the plurality of masters are not ready to receive requested data.

10. The electronic system of claim 8, wherein a first slave delays transferring first data requested by a first master when a first control signal indicating said first master is not ready to receive the first requested data.

11. The electronic system of claim 8, wherein said first control signal further indicates a second master is ready to receive second data requested thereby from said first slave, said first slave transferring the second requested data to said second master in response to said first control signal.

12. The electronic system of claim 8, each of said slaves including respective buffers, data requested from a particular slave by a requesting master being retained in the buffer of the particular slave when a corresponding control signal indicates to the particular slave that the requesting master is not ready to receive the requested data, the requested data being retained in the buffer of the particular slave until the corresponding control signal indicates to the particular slave that the master is ready to receive the requested data from the particular slave.

13. A system-on-chip (SoC) integrated circuit (IC), comprising:
a substrate;
a bus controller disposed upon said substrate;
a plurality of slaves disposed upon said substrate and interconnected with said bus controller via a respective slave data bus also disposed upon said substrate;
a plurality of masters disposed upon said substrate, said plurality of masters interconnected with said bus controller via a respective master data bus also disposed upon said substrate, said a first one of the plurality of masters configured to issue requests for data to a first one of the plurality of slaves and a second one of the plurality of slaves, a second one of the plurality of masters configured to issue a request to the first one of the plurality of slaves;
said at least one slave configured for receiving said requests for data and providing said requested data; and
control signals issued by said bus controller to said slaves, said control signals indicating to said slaves a readiness of said first one of the plurality of masters to receive requested data, the second one of the plurality of slaves sending the requested data to the first one of the plurality of masters causing the first one of the plurality of slaves to send the data reciuested from the second one of the plurality of masters to the second one of the plurality of masters without having to stall awaiting the first one of the plurality of masters to become ready.

14. The SoC IC of claim 13, wherein said control signals indicate to said the plurality of slaves which one or more plurality of masters are not ready to receive requested data.

15. The SoC IC of claim 14, wherein said control signals indicate to one or more slaves which one or more masters are ready to receive requested data.

16. The SoC IC of claim 13, wherein a first slave delays transferring first data requested by a first master when a first control signal indicating said first master is not ready to receive the first requested data.

17. The SoC IC of claim 13, wherein said first control signal further indicates a second master is ready to receive second data requested thereby from said first slave, said first slave transferring the second requested data to said second master in response to said first control signal.

18. The SoC IC of claim 13, each of said slaves including respective buffers, data requested from a particular slave by a requesting master being retained in the buffer of the particular slave when a corresponding control signal indicates to the particular slave that the requesting master is not ready to receive the requested data, the requested data being retained in the buffer of the particular slave until the corresponding control signal indicates to the particular slave that the master is ready to receive the requested data from the particular slave.

19. A method of transferring data within an electronic system, comprising
issuing requests for a plurality of slaves to provide requested data to a first master;
issuing a request from a second master to a first one of the plurality of slaves to provide requested data to the second master;
indicating to the first slave when the first masters is not ready to receive data it has requested from the first slave;
delaying the transfer of data from the first slave to the first master; and transferring data from the first slave to the second master without having to stall awaiting the first master to become ready.

20. The method of transferring data of claim 19, wherein said indicating step comprises issuing control signals to each of said plurality of slaves, said control signals indicative of whether the first and second masters are ready to receive data from each of the plurality of slaves.

* * * * *